United States Patent [19]

Morita et al.

[11] Patent Number: 4,723,134
[45] Date of Patent: Feb. 2, 1988

[54] APPARATUS FOR WRAPPING PAPER VIA A TAPE CUTTER AROUND A CYLINDRICAL DRUM

[75] Inventors: Yasuyuki Morita, Yokohama; Yoshiyuki Sugiyama, Ayase; Shinichiro Aoki, Kawasaki, all of Japan

[73] Assignee: Matsushita Electric Industrial Co., Ltd., Japan

[21] Appl. No.: 861,252

[22] Filed: May 9, 1986

[30] Foreign Application Priority Data

May 10, 1985 [JP] Japan .............................. 60-69501

[51] Int. Cl.$^4$ ..................... G01D 15/28; B41F 27/06; B65R 5/14; G03G 15/00
[52] U.S. Cl. ..................................... 346/138; 346/24; 161/415.1; 271/277; 355/3 DR; 358/291
[58] Field of Search ............... 346/138, 24; 101/415.1; 271/277; 355/3 DR; 358/291

[56] References Cited

U.S. PATENT DOCUMENTS

| | | | |
|---|---|---|---|
| 2,739,031 | 3/1956 | Meer | 346/121 X |
| 3,143,020 | 8/1964 | Ehinger | 83/286 X |
| 4,259,695 | 3/1981 | Nakano | 358/291 X |
| 4,517,575 | 5/1985 | Karimoto et al. | 346/138 |

Primary Examiner—Clifford C. Shaw
Assistant Examiner—Gerald E. Preston
Attorney, Agent, or Firm—Lowe, Price, LeBlanc, Becker & Shur

[57] ABSTRACT

Disclosed is an apparatus for wrapping paper on a cylindrical drum for use in a recording or reading system. The apparatus includes a roller for pressing the paper wrapped on the cylindrical drum. The roller is disposed in the vicinity of the cylindrical drum and in parallel to the axis of the cylindrical drum and is supported by a pair of roller-supporting plates disposed facing each other. Also included is a connecting rod disposed in parallel to the roller. The connecting rod penetrates a through-hole made in a substantial center portion of each of the roller-supporting plates and is supported by a pair of rod-supporting plates disposed outwardly with respect to the pair of roller-supporting plates. A lever is mounted on an end of at least one of the roller-supporting plates, which end is opposite to the other end where the roller is supported, so that the roller is rotatable about the axis of the connecting rod with the operation of the lever. The pair of roller-supporting plates are biased by a pair of springs so that the roller is pressed toward the cylindrical drum.

6 Claims, 10 Drawing Figures

APPARATUS FOR WRAPPING PAPER VIA A TAPE CUTTER AROUND A CYLINDRICAL DRUM

BACKGROUND OF THE INVENTION

The present invention relates to an apparatus for wrapping paper on a cylindrical drum, and in particular to an apparatus for wrapping recording or recorded paper on a cylindrical drum in a recording or reading system such as a printer or reader and an improved drum therefor.

Various types of apparatus for wrapping paper on a cylindrical drum have been devised hitherto. One known arrangement is shown in FIG. 1 wherein one edge 2a of a sheet of paper 2 is aligned with a ruled line 60 on a cylindrical drum 6 to be first stuck thereon by an adhesive tape 105. A free end of the tape is drawn out through a guide roll 104 from a tape holder and a length of tape to the other end 2b thereof is applied to adhere or stick to the cylindrical drum 6. The adhesive tape 105 is cut by a tape cutter 106 after the sticking, so that a portion of the cut adhesive tape 105 extends beyond the end of the cylindrical drum 6, the excess length corresponding to the distance between the the end of the drum 6 and the tape cutter 106. The excess portion of the tape must be removed to present malfunction of the system.

In this arrangement, the excess tape will typically be removed by cutting it with shears or the like, or it will be stuck to the adjacent end surface of the cylindrical drum 6. This results in reduction in work efficiency.

Another known arrangement is illustrated in FIG. 2, wherein an end of paper 2 is stuck by an adhesive tape 28a on a cylindrical drum 6 and the paper 2 is wrapped around the drum 6 by rotating the same in the paper-wrapping direction indicated by an arrow 62 as it is pressed by the aid of a roller 7. The pressing to the paper 2 is achieved by pushing a lever 8 associated with the roller 7 and the release of the pressing is accomplished by pulling the same to the position indicated by the reference numeral 8' so that the roller 7 is separated from the cylindrical drum 6 to the position indicated by numeral 7'. The lever 8 is maintained at the position 8' by the weight thereof.

In such an arrangement, because the lever 8 is operated by an operator's hand, it is difficult to maintain the pressing force constant and therefore the result of any irregularity is apt to appear on the surfce of the paper 2. Excessive pressing force will cause the paper 2 to be stained and damaged. Furthermore, according to the conventional arrangement, the system can be operated with the roller 7 coming into contact with the cylindrical drum 6, resulting in malfunction.

SUMMARY OF THE INVENTION

The present invention has been developed in order to remove the above-described drawbacks inherent in the prior art arrangements.

An object of the invention is therefore to provide a new and improved apparatus which is capable of accurately wrapping paper on a cylindrical drum without generating irregularity on the surace of the paper and causing stain and damage of the paper.

Another object of the invention is to provide a paper-wrapping apparatus with a safety device which is capable of ensuring that a system is operated only when the paper-pressing roller is separated from the cylindrical drum.

A further object of the invention is to provide a paper-wrapping apparatus which is capable of preventing an adhesive tape from extending beyond an end of the cylindrical drum.

With these and other objects which will be become apparent as the description proceeds, an apparatus according to the present invention includes a roller for pressing the paper wrapped on the cylindrical drum. The roller is disposed in the vicinity of the cylindrical drum and in parallel to the axis of the cylindrical drum and is supported by a pair of roller-supporting plates disposed facing each other. Also included is a connecting rod disposed in parallel to the roller. The connecting rod penetrates a through-hole made in a substantial center portion of each of the roller-supporting plates and is supported by a pair of rod-supporting plates disposed outwardly with respect to the pair of roller-supporting plates. A lever is mounted on an end portion of at least one of the roller-supporting plates in opposition to the portion supporting the roller with respect to the connecting rod so that the roller is rotatable about the axis of the connecting rod with the operation of the lever.

In accordance with a feature of the present invention, the pair of roller-supporting plates are biased by a pair of springs so that the roller comes into contact with the cylindrical drum. This feature provides an advantage in that when wrapped on the cylindrical drum, the paper is pressed with a uniform force.

In accordance with a further feature of the present invention, when a cover for the cylindrical drum is closed with the roller coming into contact with the cylindrical drum, the lever is pushed by the cover so that the roller is separated therefrom. This feature ensures that the cylindrical drum is always actuated with the condition that the roller is separated thereform.

In accordance with another feature of the present invention, the cylindrical drum has at least one tape cutter for cutting an adhesive tape for sticking paper wrapped to a circumferential surface of said cylindrical drum. The tape cutter is provided in a recess formed in a peripheral portion of said cylindrical drum. Therefore, it is possible to prevent a length of adhesive tape from extending beyond an adjacent end of the cylindrical drum.

DETAILED DESCRIPTION OF THE INVENTION

Figure 1:
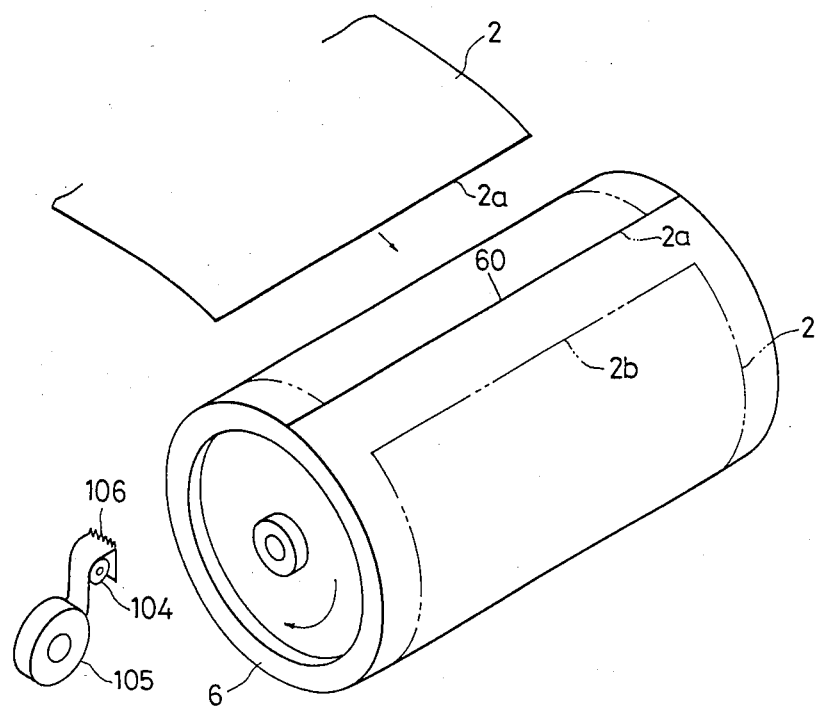
FIG. 1 is a schematic illustration of a conventional apparatus for wrapping paper on a cylindrical drum.
Figure 2:
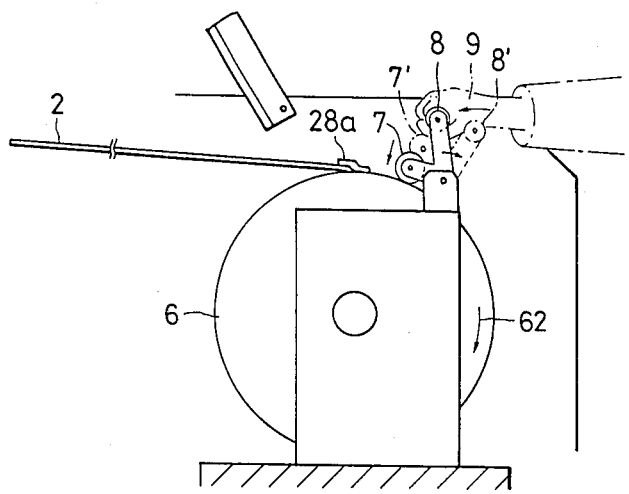
FIG. 2 is a schematic diagram showing another conventional apparatus for wrapping paper on a cylindrical drum.
Figure 3:
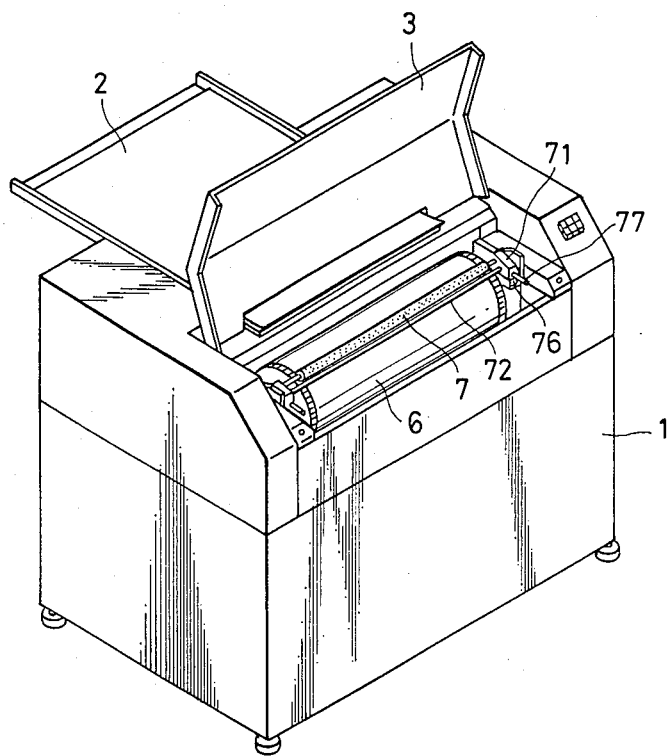
FIG. 3 is a perspective view illustrating an apparatus for wrapping paper around a cylindrical drum according to a preferred embodiment of the present invention incorporated in a recording or reading system.

FIGS. 3 to 8 are illustrations of an apparatus for wrapping paper on a cylindrical drum according to a first embodiment of the present invention. Of these, FIG. 3 shows the apparatus incorporated in a recording or reading system 1. A detailed description of the apparatus according to the preferred embodiment follows, with reference to FIGS. 4 and 5. The apparatus comprises a paper-pressing roller 7 which has a cylindrical and elongated configuration and which is disposed in opposed relation to a cylindrical drum 6 on which a length of paper 2 is wound, the axis of the paper-pressing roller 7 being parallel to the axis of the cylindrical drum 6. The paper-pressing roller 7 is supported by a pair of roller-supporting plates 71 which are disposed facing each other.

Illustrated at the reference numeral 73 is a connecting rod, the ends of which are fixedly secured by screws 74 to a pair of rod-supporting plates 51 that are fixedly secured to a pair of drum-supporting plates 5. The rod-supporting plates 51 and the drum-supporting plates 5 are stationary. The connecting rod 73 penetrates a through-hole (not numbered) defined at a substantially central portion of each of the roller-supporting plates 71, and the axis thereof is parallel to the axis of the paper-pressing roller 7.

A connecting pipe 72, having the connecting rod 73 therein, is provided to allow the pair of the roller-supporting plates 71 to be connected with each other. A lever 77 is fixedly secured to an end portion of the roller-supporting plate 71, which end is opposite to the other end where said paper-pressing roller is supported, so that the paper-pressing roller 7 is rotated about the connecting rod 73 in response to the operation of the lever 77. The lever 77 has a wheel 78 at the other end portion opposite to the end with is connected to the roller-supporting plate 71.

Each of the roller-supporting plates 71 is biased by a spring 75, e.g., a torsion spring, in a direction such that the paper-pressing roller 7 is pressed toward the cylindrical drum 6. The torsion spring 75 is encased in a recess formed in the rod-supporting plate 51 and has a pin for pushing the roller-supporting plate 71. The paper-wrapping apparatus according to the embodiment of the present invention further includes a locking device comprising a locking pin 52. The pin 52 is encased in the recess portion defined in the rod-supporting plate 51 while the paper-pressing roller 7 comes into contact with the cylindrical drum 6 or presses paper. Pin 52 is biased by a coil spring 53 in the direction way from the rod-supporting plate 51 and toward the roller-supporting plate 71, i.e., the direction indicated by an arrow A. Pin 52 is thus automatically inserted into a hole defined in the roller-supporting plate 71 when the roller 7 is separated from the cylindrical drum 6 with the operation of the lever 77. The locking action is released by pushing a knob 76 in the direction opposite to the direction indicated by the arrow A with a finger of a hand 9 so that the paper-pressing roller 7 becomes rotatable about the axis of the connecting rod 73 and comes into contact with the cylindrical drum 6 by the biasing force of the torsion spring 75. The paper-pressing roller 7 will be made of an elastic material, such as rubber, in order to accurately press paper 2 to the circumferential surface of drum 6 without damage to the paper.

Figure 6:
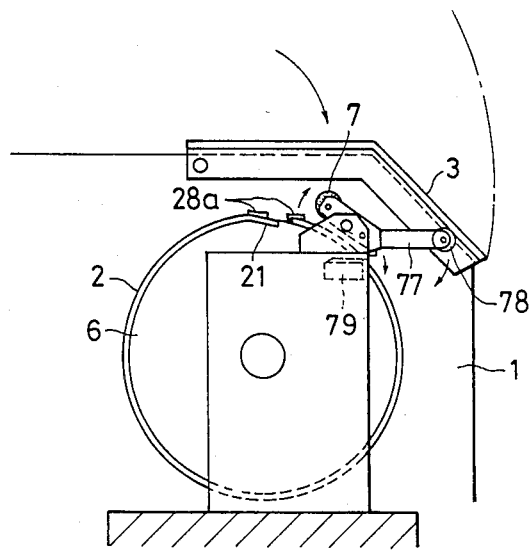
FIGS. 6, 7 and 8 are side views illustrating the apparatus according to the preferred embodiment of the present invention.
Figure 7:
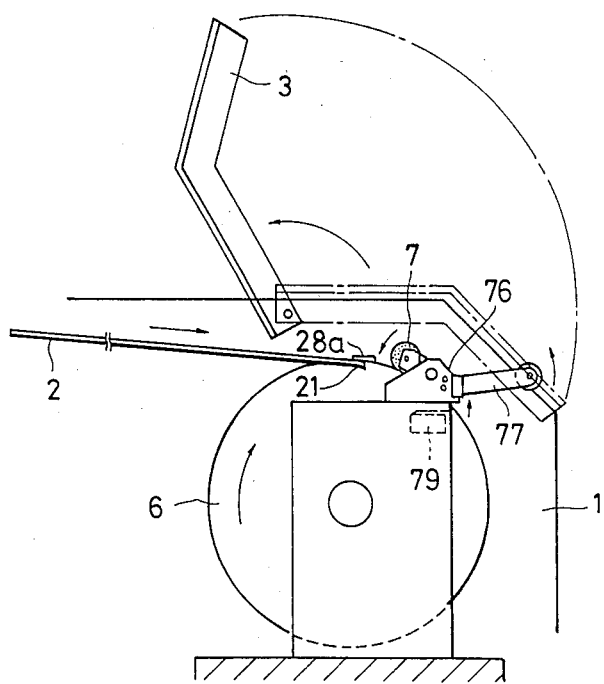

FIGS. 6 and 7 are side views illustrating the apparatus according to the present invention as incorporated in a recording or reading system 1. FIG. 6 shows the condition such that a cover 3 of the system 1 is closed, while FIG. 7 illustrates the condition such that the cover 3 is opened. As seen from these figures, when the cover 3 is closed, the wheel 78 of the lever 77 is pressed by the cover 3, whereby the paper-pressing roller 7 is separated from the cylindrical drum 6. Therefore, with the condition that the paper-pressing roller 7 comes into contact with the drum 6 or the paper 2, the actuation of the system can be prevented.

The reference numeral 79 represents a switch, such as a limit switch, which is provided to allow the system 1 to be actuated when the paper-pressing roller 7 is pulled up to be separated from the drum 6. The switch 79 is arranged such that a system-actuating circuit is closed when the lever thereof is pushed by the lever 77, for example. When the paper 2 is wrapped around the cylindrical drum 6, as shown in FIG. 7, the cover 3 is opened, whereby the paper-pressing roller 7 can come into contact with the drum 6, and then the paper 2 is inserted into a groove 21 axially made in the outer surface of the drum 6 and is wrapped around the drum 6 with it being pressed by the paper-pressing roller 7. Both ends of the paper 2 are respectively stuck by adhesive tape 28a. The provision of the groove 21 results in the accurate and easy positioning of the paper 2.

Figure 8:
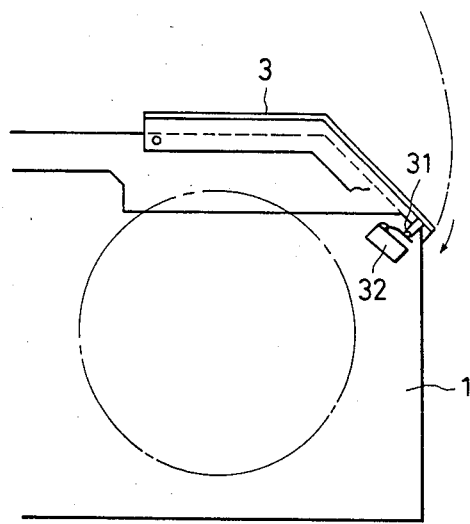

FIG. 8 is an illustration of a further safety device. This safety device comprises a pin 31 provided on the cover 3 and a switch 32 provided at the position that the lever thereof is pushed by the pin 31 when the cover 3 is closed. This arrangement allows the system 1 to be actuated only when the cover 3 is closed, resulting in increase in safety. In this case, it is appropriate to use a contactless switch.

Figure 4:
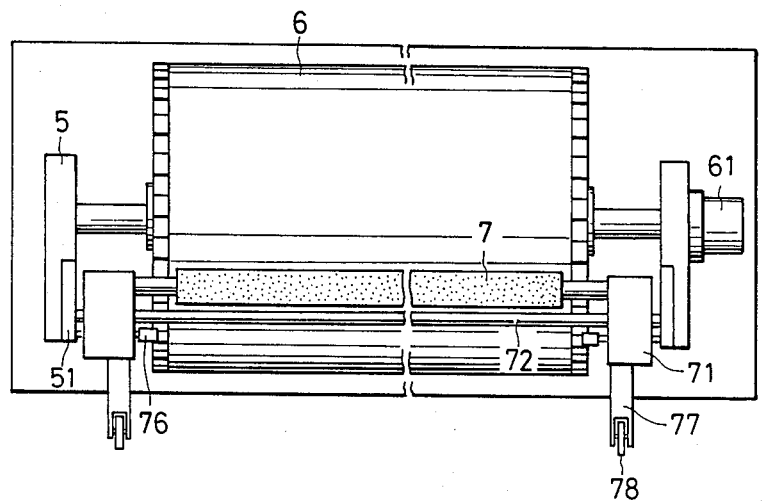
FIG. 4 is a plan view showing the paper-wrapping apparatus in accordance with the preferred embodiment of the present invention.
Figure 5:
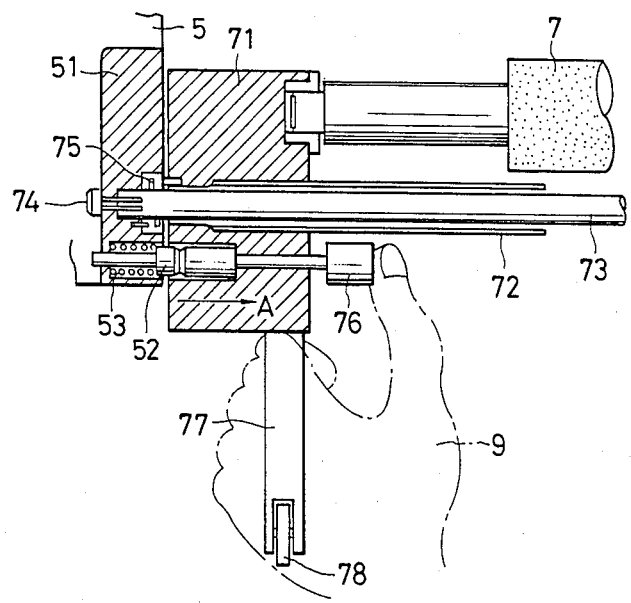
FIG. 5 is a partial cross-sectional view of the apparatus of FIG. 4.
Figure 9:
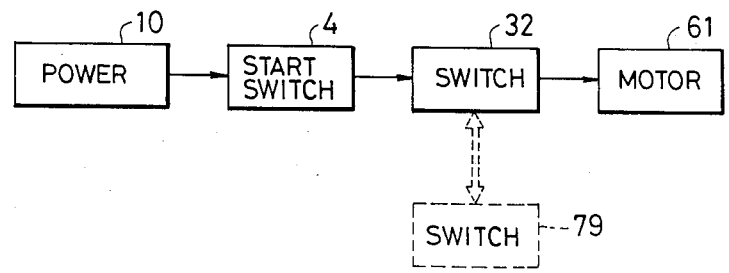
FIG. 9 is a block diagram showing a drive circuit for a drum-driving motor.

FIG. 9 is a drive circuit for a motor 61, FIG. 4, for driving the cylindrical drum 6. The motor 61 is coupled through a start switch, not shown, and the switch 32 and/or the switch 79 to a power supply. Therefore, the actuation of the cylindrical drum 6 is performed only when these switches are respectively closed, that is, the drum 6 can be rotated with the condition that the paper-pressing roller 7 is separated from the cylindrical drum 6 and the cover 3 is closed.

Figure 10:
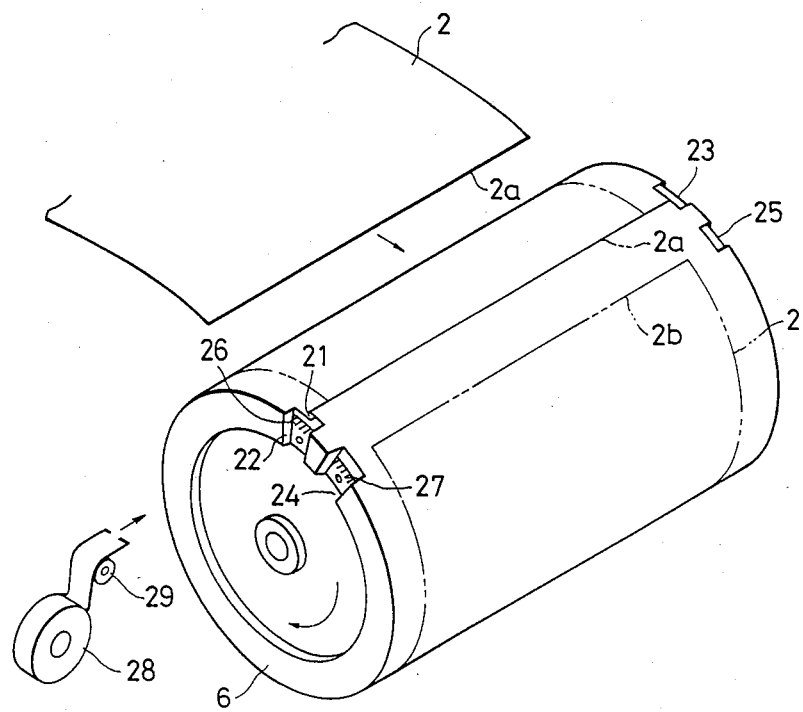
FIG. 10 is a perspective view illustrating a paper-wrapping apparatus according to another embodiment of the present invention.

FIG. 10 shows a paper-wrapping apparatus according to a second embodiment of the present invention.

Illustrated at the reference numeral 6 is a cylindrical drum on which paper 2 is wrapped and stuck. On the surface of the cylindrical drum 6, is an axially defined groove 21 for positioning the paper 2, an end 2a of the paper being inserted into groove 21. The cylindrical drum 6 has a pair of recess portions 22 and 23 and another pair of recess portions 24 and 25 on the peripheral portions thereof as clearly seen from FIG. 10. The pair of recess portions 22 and 23 are aligned with the two ends of the groove 21, whereas the recess portions 24 and 25 are defined at positions of the peripheral portions which is aligned with the other end 2b of the paper wrapped on the cylindrical drum 6. Tape cutters 26 and 27 are respectively provided in at least the recesses 22 and 24 such that the edges thereof extend axially and outwardly of the drum 6, but do not project from the side surface of the cylindrical drum 6. Therefore, the center line of the tape cutter 26 substantially aligns with the longitudinal axis of the groove 21, while the center line of the tape cutter 27 is substantially aligned with the prolongation of the edge 2b of the paper 2.

In operation, the edge 2a of the paper 2 is first inserted into the groove 21 and then adhered thereat to the drum by an adhesive tape 28 taken out from a tape holder, not shown, through a guide roller 29. In this case, because the sticking position are made clear by the aid of the recess portions 22, 23, it is possible to easily and accurately perform the sticking of edge 2a by the adhesive tape 28. Furthermore, because of the provision of the tape cutters 26 and 27 in the recess portions 22 and 24 provided at the peripheral portion of the drum 6, the extending portion of the adhesive tape 28 is not present after sticking, so that concern about it is removed, resulting in improvement in work efficiency. Secondly, the cylindrical drum 6 is rotated to wrap the paper therearound and the other end portion 2b thereof is stuck by the adhesive tape 28 in the same manner as in the case of the end portion 2a.

The above-described embodiments are just examples of the present invention, and therefore, it will be apparent for those skilled in the art that many modifications and variations may be made without departing from the spirit of the present invention.

What is claimed is:

1. A drum scanning type recording/reading apparatus, comprising:
   a cylindrical drum allowing a sheet of recording/reading paper to be wrapped on its circumferential surfce, said cylindrical drum having a groove axially formed in the circumferential surface thereof where one end of the paper is inserted and having a tape cutter provided in a recess portion defined in a peripheral end portion thereof for cutting adhesive tape applied to stick the paper to be wrapped on said cylindrical drum, said tape cutter being positioned to be aligned with one end of said groove; and
   a paper setting device, including roller means for pressing said paper wrapped on said cylindrical drum toward said cylindrical drum, said roller means being disposed in the vicinity of said cylindrical drum to be parallel to the axis of said cylindrical drum, a pair of roller-supporting plates for supporting said roller means, said pair of roller-supporting plates being disposed facing each other, a connecting rod disposed in parallel to said roller means, said connecting rod penetrating a through-hole made in a substantially center portion of ech of said roller-supporting plates and being supported by a pair of stationary rod-supporting plates disposed outwardly with respect to said pair of roller-supporting plates, a lever connected to the other end of at least one of said roller-supporting plates which end is opposite to the end where said roller means is supported, so that said roller means is rotatable about the axis of said connecting rod with the operation of said lever, spring means for biasing said pair of roller-supporting plates so that said roller means is pressed toward said cylindrical drum, and locking mens for locking at lest one of said pair of roller-supporting plates when said roller means is separated from said cylindrical drum.

2. An apparatus as claimed in claim 1, wherein said locking means comprises a locking pin, said locking pin being biased by a spring toward said roller-supporting plate and being inserted into a hole defined in said roller-supporting plate when said lever is operated so that said roller means is separated from said cylindrical drum.

3. An apparatus as claimed in claim 1, wherein said lever has a wheel at a free-end portion thereof, and when a cover for said cylindrical drum is closed with the condition that said roller means comes into contact with said cylindrical drum or the paper, said wheel being pushed by said cover so that said roller means is separated from said cylindrical drum 4. An apparatus as claimed in claim 3, further comprising switch means for allowing said cylindrical drum to be actuated when said cover is closed.

5. A cylindrical drum for use in a recording or reading system comprising:
   tape cutter means attached to the drum for cutting an adhesive tape sticking paper wrapped on a circumferential surface of said cylindrical drum, wherein the tape cutter means is provided in a recess formed in a circumferential portion of said cylindrical drum and the center line of said recess is aligned with the longitudinal axis of a groove axially formed on the circumferential surface of said cylindrical drum for inserting an edge portion of said paper.

6. A cylindrical drum as claimed in claim 5, wherein said tape cutter comprises an edge portion extending axially and outwardly of said cylindrical drum.

* * * * *